H. G. CAMERON.
HEADLIGHT ATTACHMENT.
APPLICATION FILED APR. 15, 1910.
1,057,374.
Patented Mar. 25, 1913.
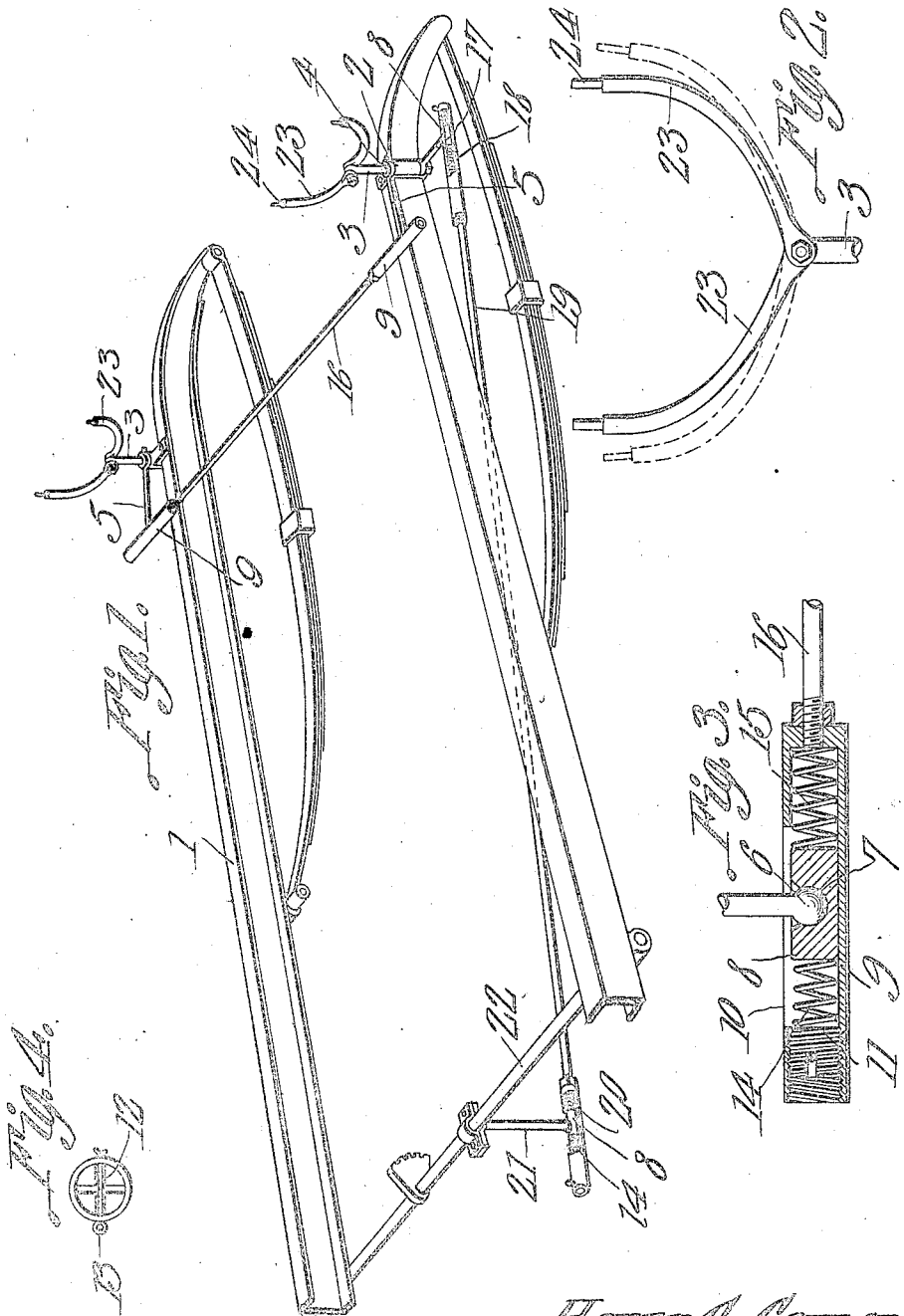
Witnesses
Harry G. Cameron,
Inventor
by
Attorneys

UNITED STATES PATENT OFFICE.

HARRY G. CAMERON, OF BLOOMINGTON, ILLINOIS.

HEADLIGHT ATTACHMENT.

1,057,374.

Specification of Letters Patent.  Patented Mar. 25, 1913.

Application filed April 15, 1910. Serial No. 555,721.

*To all whom it may concern:*

Be it known that I, HARRY G. CAMERON, a citizen of the United States, residing at Bloomington, in the county of McLean and State of Illinois, have invented a new and useful Headlight Attachment, of which the following is a specification.

This invention relates to apparatus for automatically shifting the headlights of automobiles and other vehicles so as to turn them in the direction in which the machine is traveling.

Headlights when fixedly mounted upon the vehicle are objectionable because, when the same is turning corners the light is not turned in the direction in which the vehicle is traveling and therefore the roadway is not sufficiently lighted to assist the driver or to give warning to persons in the path of the vehicle.

One of the objects of the present invention is to provide simple mechanism of novel construction and which will automatically turn the headlights with the front or steering wheels of the vehicle.

A further object is to provide a headlight attachment of this character which can be readily applied to ordinary makes of automobiles and other vehicles and which is inexpensive in construction and will not readily get out of order.

A further object is to provide an attachment the operating mechanism of which is provided with novel cushioning means at the joints whereby objectionable rattling is eliminated and the entire mechanism rendered more or less elastic in operation.

With these and other objects in view the invention consists of certain novel details of construction and combinations of parts hereinafter more fully described and pointed out in the claim.

In the accompanying drawings the preferred form of the invention has been shown.

In said drawings:—Figure 1 is a perspective view of a portion of the chassis of an automobile and showing the present improvements applied thereto, certain of the parts being broken away. Fig. 2 is a front elevation of one of the lamp brackets, the positions of the parts when adjusted to support a larger lamp, being indicated by dotted lines. Fig. 3 is an enlarged longitudinal section through one of the connections between two of the parts of the lamp operating mechanism. Fig. 4 is an end elevation of the connection shown in Fig. 3.

Referring to the figures by characters of reference 1 designates the chassis of an automobile to the sides of the front portion of which are secured supporting sleeves 2. A stem 3 is mounted for rotation in each of the sleeves and is held against downward movement by a collar 4 from which projects a radial arm 5. This collar is of course secured upon the stem in any suitable manner as by means of a set screw. Each of the arms 5 has a ball 6 formed upon the free end thereof and projecting into a socket 7 formed within a block 8 which is slidably mounted within a tubular casing 9. A slot 10 is formed longitudinally within this casing to permit the said casing to shift longitudinally upon the block 8 and a screw plug 11 is detachably mounted within one end of the casing. This screw plug has intersecting grooves 12 formed in the outer end thereof and disposed at right angles to each other, said grooves being of considerable depth and any one of them being adapted to receive a cotter pin 13 which is disposed diametrically within the casing 9. A coiled spring 14 is interposed between the screw plug and one end of the block 8 and another coiled spring is interposed between said block and the opposite end of the casing. It will thus be seen that the block is held normally in a predetermined position within the casing by the opposed spring.

The two casings 9 which are connected to the respective arms 5 are, in turn, rigidly connected by a cross rod 16 so that the said casings will be shifted together.

The lower end of one of the stems 3 is fixedly secured to a laterally extending arm 17 extending into a casing 18 having cushioning means therein such as has been shown and described in connection with the casing 9. A rod 19 is fixedly attached to this casing 18 and to another casing 20 which also has cushioning means therein such as has been shown in the casings 9 and this casing 20 engages one end of an arm 21 which extends radially from the sector shaft 22 of the steering mechanism.

Each of the stems 3 has operatively extending bowed arms 23 pivotally connected to the upper end thereof and adapted to be swung toward or from each other so as to receive between them lamps of different sizes. The upper ends of the arms 23 are reduced as shown at 24, so as to project into the sockets usually provided upon the sides of the head lamps of an automobile.

It is to be understood that the various parts of the mechanism are to be adjusted so that when the steering wheels are extended straightforward relative to the machine, the arms 23 of the two lamp supporting brackets will be in a plane extending transversely of the said machine and at right angles to the longitudinal center thereof. When the sector shaft is turned by the steering wheel the arm 21 will pull or push upon the rod 19 so as to swing the arm 17 and the rotating stem 3 connected to said arm 17 will swing its arm 5 laterally and will thus shift the rod 16 transversely of the machine and cause a corresponding movement of the stem 3 at the other side of the machine. The two lamps supported by the stems 3 will thus be turned simultaneously with, and in the same direction as the steering wheels so that, when the automobile is turning, the light from the head lamps will always be thrown in the direction in which the front wheels are turned.

By providing the cushioning connections between the various arms and rods, rattling of the mechanism is prevented and the entire apparatus is rendered more or less elastic so as to operate smoothly. The stress of the springs within the casings can be varied by adjusting the screw plugs 11. To effect this adjustment it is first necessary to remove the cotter pin engaging each of the plugs and after the adjustment has been made, the said pin can be reinserted into the groove 12 alining with the pin openings. By arranging two intersecting grooves in each screw plug a very minute adjustment of the plugs can be made.

It will be seen that the attachment which has been described can be readily applied to various makes of automobiles and by reason of its simplicity and compactness, it will not mar the appearance of the machine or easily get out of order. Moreover the said attachment can be employed with various forms of vehicles other than automobiles.

Various changes can of course be made in the construction and arrangement of the parts without departing from the spirit or sacrificing any of the advantages of the invention as defined in the appended claim.

What is claimed is:—

In an attachment for automobiles, a stem mounted for rotation; a lamp-engaging member carried by the stem; there being an arm projecting from the stem and provided at its free end with a ball; a tubular casing; actuating means connected with the casing; springs located in the casing and abutting at their outer ends against the casing; and a block fitting closely in the casing for sliding movement, the inner ends of the springs abutting against the block and the ball being rotatably mounted in the block.

In testimony that I claim the foregoing as my own, I have hereto affixed my signature in the presence of two witnesses.

HARRY G. CAMERON.

Witnesses:
HERBERT D. LAWSON,
FRANK B. OCHSENREITER.